(No Model.)
W. E. WORTHEN.
VALVE FOR PUMPS.
No. 263,377. Patented Aug. 29, 1882.
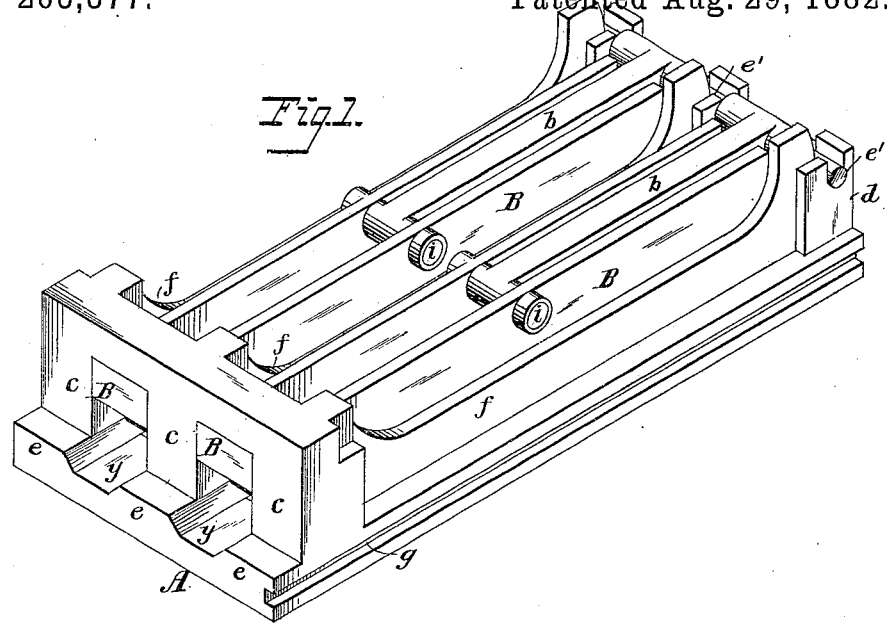
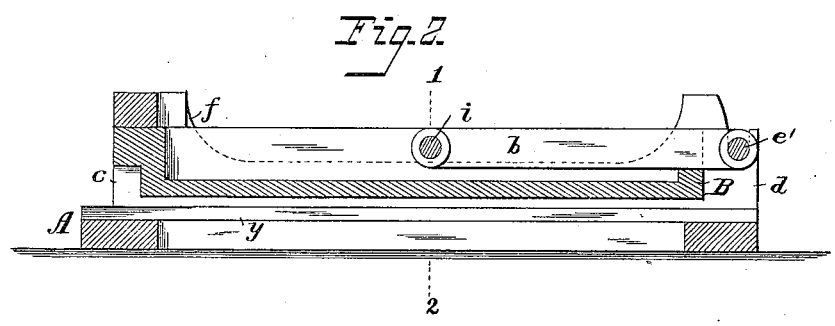
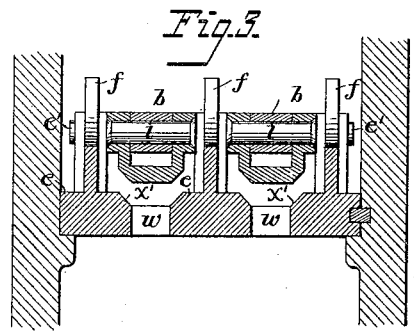
Attest:
Courtney A. Cooper
H. C. Hansmann
Inventor,
W. E. Worthen
By his attorney
Charles E. Foster

UNITED STATES PATENT OFFICE.

WILLIAM E. WORTHEN, OF NEW YORK, N. Y.

VALVE FOR PUMPS.

SPECIFICATION forming part of Letters Patent No. 263,377, dated August 29, 1882.

Application filed April 3, 1882. (No model.)

*To all whom it may concern:*

Be it known that I, WILLIAM E. WORTHEN, of the city, county, and State of New York, have invented certain Improvements in Valves for Pumps, &c., of which the following is a specification.

My invention is a valve device constructed, as fully described hereinafter, so as to afford a free passage for the fluid, with but a comparatively slight lift of the valves, maintain the latter in their positions without undue friction, and facilitate the manufacture and repair of the device, and secure it firmly in its place in the case of the pump.

In the drawings, Figure 1 is a perspective view, showing one form in which my improved valve device may be made. Fig. 2 is a longitudinal section through the center of one of the valves. Fig. 3 is a transverse section on the line 1 2, Fig. 2.

The device in its general structure is somewhat similar to that shown in the Letters Patent for pump-valves granted to me on the 17th day of April, 1877—that is, there is a gridiron-plate, A, resting on bearings in the pump-casing, having a series of longitudinal ports, $w$, and seats for a series of corresponding bar-valves, B. In this instance, however, in place of the valves being connected together, each works independently of the others. The valve-seats $x'$, as shown, are beveled, but may be like those in my patented device aforesaid, and are formed by casting the plate A with ribs $e$ above the face $y$, at each side of the ports $w$, and then beveling or planing off the edges of these ribs, thus accurately forming the faces $x'$ by ordinary appliances. The valve-plate is provided with longitudinal webs $f$ between the valve-ports, and connecting the guides $c$ at one end and the bearing-blocks $d$ at the other, the latter being recessed to receive trunnions at the sides of links $b$, by which the valves B are retained in position. Each valve is a hollow bar fitting its seat, one end of the bar extending between and being guided by the guide-blocks $c$, the other end extending between the bearing-blocks $d$, a cross-pin, $i$, passing through the cheeks of the valve and through the end of the link $b$, connecting the latter to the valve near the center thereof. While the blocks $c$ $d$ serve to prevent the tilting of the valve, the latter is not fitted so nicely as to cause any friction or binding, and the valve is maintained parallel to the other valves by the guides, and depends for its retention on the link $b$, the length of which is such as to permit free and easy movements of the valve without danger of jamming.

By the combination of a series of independent bar-valves, constructed and arranged as set forth, I secure a ready flow of the water without "drawing" or unduly obstructing the current, maintain tight ports when the valves are closed, and avoid all end friction. Any one valve can be readily removed and repaired without interfering with the others. The bearing-faces are easily fitted to each other and do not wear open. The valves may be made light in weight, so as to lift and seat easily, and operate without danger of catching in the guides, and without jar or noise, and with certainty, whatever may be the speed of the pump.

The longitudinal webs $f$ serve not only to strengthen the valve-plate A, but give direction to the water issuing through the valve, so that the currents do not conflict with each other.

I have in some instances used two links to each valve, with such loose connections as will permit vertical motion, and in place of pivoting the rigid links I have employed strips of flexible metal riveted or otherwise secured at the ends to the valves and to the plate. When spring metal is thus used it serves to quicken the closing of the valves.

It will be obvious that by a combination of a number of valved plates, as described, any desired arrangement of ports can be secured, and that the valve device may be used in an inclined position, as well as horizontally, without increasing the friction or impairing the efficiency of the valves. In one edge of the valve-plate is a groove, $g$, adapted to receive a key, by which the plate can be firmly wedged in its place in the pump-casing, thus securing tight joints.

I claim—

1. A valve device consisting of a valve-plate having a series of parallel longitudinal ports, and a series of independent bar-valves adapted thereto and connected by flexible connections to the plate, to permit each to move independently of the others, substantially as set forth.

2. The combination of the valve-plate having longitudinal ports and fixed guides, and bar-valves extending between the guides, and links connecting the separate valves to the plate, substantially as set forth.

3. The plate A, having ports $w$, guides $c$, and recessed blocks $d$, in combination with the valves B and links $b$, pivoted to the valves and provided with trunnions fitting bearings in the blocks $d$, substantially as specified.

4. The valve-plate with ports and intermediate webs, $f$, in combination with bar-valves B, substantially as set forth.

In testimony whereof I have signed my name to this specification in the presence of two subscribing witnesses.

WILLIAM E. WORTHEN.

Witnesses:
   THOS. I. WHISTLER,
   ALBERT N. CONNETT.